UNITED STATES PATENT OFFICE.

EMILE GRIVEL, OF PARIS, FRANCE, ASSIGNOR TO ALBERT L. DU PAGET, OF HOBOKEN, NEW JERSEY.

IMPROVEMENT IN COMPRESSED FOOD.

Specification forming part of Letters Patent No. 201,878, dated April 2, 1878; application filed November 4, 1876.

*To all whom it may concern:*

Be it known that I, EMILE GRIVEL, of Paris, France, have invented a certain new and useful Preserve Composition for Food, of which the following is a full, clear, and exact description, sufficient to enable others skilled in the art to make and use the compound.

The object of the invention is to produce such a composition for food as shall be capable of being kept in any climate for an indefinite length of time, remain unimpaired by the influence of salt or fresh water, be capable of being compressed into a small compass for convenience in transportation, be quickly prepared for use, and be free from all deleterious substances, such as are ordinarily incorporated in compounds of a like general character for purposes of preserving them.

In the preparation of the improved composition I employ the following substances: Farinaceous articles, such as pease, haricots, lentils, Indian corn, beans, &c., in the form of flour or meal, or vegetable flour of any character; lean meat of any kind, fat of meat; vegetables, such as onions, &c.; salt, pepper, and spices, if desired.

In order to prepare about two hundred pounds weight of the composition, I place in a suitable vessel (which should be heated by steam or other bath, but not by direct heat) about twenty pounds of fine white salt, which is to be stirred until all the moisture is expelled. I then add about one hundred pounds of the flour, which should be incorporated with the salt in a thorough manner, and be continuously heated therewith for about one hour. To this heated mixture is added about forty pounds of the lean meat, which has been previously thoroughly cured by salting, smoking, &c., partially cooked, and then chopped fine. Ten pounds of onions, or thereabout, are hashed and roasted in fat, and then added to the above mixture, with spices, if desired, for flavoring. After these ingredients are completely mixed, I then add about forty or fifty pounds of hot fat, from which the water has been expelled by gentle heat, and from which all fibrous matters have been carefully removed. This fat may be previously perfumed or flavored with thyme, onions, &c., if desired. The several ingredients are then thoroughly mingled until the melted fat has become completely absorbed by the other materials, which operation will require about half an hour.

While yet hot the mass is molded in cakes of convenient size, and when these cakes become cold they are subjected to the action of a powerful press, whereby they are reduced in size, and made firm and compact. The compressed cakes may be coated with gelatine, to which a decoction of dates has been added for the purpose of softening the same, rendering it less brittle, and less liable to crack or split in handling. They may then be inclosed in a suitable envelope, to keep them clean and to protect them from injury during transportation; but this coating and envelope are in no way essential to the preservation of the compound.

When the composition is to be used for food, the desired quantity is placed in boiling water. About three ounces of the compound to a quart of water are the proper proportions. The boiling should continue for about five minutes, when a thick, nutritious, and palatable gelatinous mixture will be obtained.

From the adoption of the process substantially as explained above I am enabled to produce an article of diet which will admirably answer the several objects of the invention previously stated; and a consideration of the several steps in the manipulation of the ingredients will show that the melted fat is added at the instant when the mass of prepared flour, meat, and vegetables is freed from water, and the interstices and vesicles in the most favorable condition to receive and hold said fat.

The preservation of the improved compound is due to the presence of the fat and absence of water, as is exemplified in the preservation of potted meats, and is not attributable to any addition of spices or deleterious and objectionable chemicals, such as are frequently employed in connection with alimental compositions.

The invention should be carefully distinguished from that class of food compounds which are intended to be eaten while uncooked, or which may be prepared after the manner of ordinary sausages. These consist, chiefly, of fat meat, and are liable to deteriorate after the lapse of considerable time, whereas in the present compound only the melted fat is employed, and, so far as experiments indicate, the substance will keep an indefinite length of time without alteration.

I do not desire to be limited to the specific quantities herein named, nor to the precise proportions mentioned, inasmuch as an immaterial variation might be made without perceptive alteration in the prominent features of the article.

I am aware of the composition described and claimed in the patent to J. H. Zumstein, of June 27, 1871, wherein the preservative qualities are dependent upon certain chemicals, and which requires a skin or similar envelope to protect the mass from moisture. This compound is essentially different from the one herein specified, not only in the matters already mentioned, but in the manner of preparation, as well as in the ingredients and style of food which results from its use, it being intended to be eaten in the condition in which it is prepared for the market.

Having thus fully described my invention, what I claim as new, and desire to secure by Letters Patent, is—

The herein-described preserve composition for food, the same consisting of raw meal or flour; lean meat, previously prepared and finely divided; clear fat of meat; salt; vegetables, finely divided, and suitable flavoring and seasoning materials, the whole being united, without chemicals, in about the proportions and in the manner specified, whereby an article is produced which is adapted to form a gelatinous compound by boiling in water, for the purposes explained.

EMILE GRIVEL.

Witnesses:
A. CHUSIN,
ROBT. M. HOOPEB.